March 30, 1965 A. D. LIN ETAL 3,176,279

DATA STORAGE APPARATUS

Filed Feb. 9, 1959 4 Sheets-Sheet 1

INVENTORS.
ANDREW D. LIN
DENNIS D. WILLARD
DONALD D. JOHNSON

BY Richard E. Cummins

Attorney

DATA STORAGE APPARATUS

Filed Feb. 9, 1959 4 Sheets-Sheet 2

March 30, 1965 A. D. LIN ETAL 3,176,279

DATA STORAGE APPARATUS

Filed Feb. 9, 1959 4 Sheets-Sheet 3

United States Patent Office 3,176,279
Patented Mar. 30, 1965

3,176,279
DATA STORAGE APPARATUS

Andrew D. Lin, Campbell, Dennis D. Willard, San Jose, and Donald D. Johnson, Los Gatos, Calif., assignors to International Business Machines Corporation, New York, N.Y., a corporation of New York Filed Feb. 9, 1959, Ser. No. 792,168
16 Claims. (Cl. 340—174.1)

This invention relates in general to data storage apparatus and in particular to improved random access data storage apparatus in which data is stored on a plurality of comparatively short, noncyclic-type, compliant record carriers and in which each of the strips is selectively presentable to a read-write transducer in a cyclic manner.

Various arrangements for storing data on record members in the form of binary coded representations have been disclosed in the prior art. The record members employed by these arrangements may be conveniently classified as either cyclic carriers or noncyclic carriers. A magnetic drum or disc is an example of a cyclic carrier while a conventional magnetic tape file is an example of a noncyclic carrier.

A cyclic carrier has two important advantages over a noncyclic carrier. Conventional cyclic carriers such as drums and discs are readily adaptable to random access, that is, a particular record is directly addressable. Secondly, the transferring of data to and from the carrier by the transducer is more easily achieved since the record is being repeatedly presented to the transducer.

In contrast to these advantages a noncyclic carrier such as a magnetic tape has the advantage that a given amount of data may be stored in a smaller physical space. However, direct access to a selected record is quite impractical. In addition, because of the noncyclic nature of a conventional magnetic tape storage file, a reciprocal or back and forth motion is necessary to scan a record twice in succession.

In order to provide more direct access to a selected record in a tape file, it has been suggested by the prior art that the magnetic tape may be divided into a number of individual segments which are stacked in suitable arrays. Such suggested arrangements have the advantage that the access time to a selected record may be reduced and also maintain the space advantage of conventional tape files. However, each selected record strip still functions as a noncyclic-type carrier, mainly because the strip is never completely retracted from its storage location. As a result, a reciprocal or back and forth motion is still required for each scan of the record. In applications where the record is being continually updated, the recording and reproducing operation becomes more complex from the standpoint of the remaining portion of the system. As a result, such arrangements have had a rather limited practical application.

The present invention eliminates this disadvantage of strip-type storage apparatus by means of a novel arrangement in which each strip may be presented to a read-write transducer in a cyclic manner. The advantages from a system standpoint inherent in cyclic carriers are therefore obtained together with the space advantages inherent in strip-type storage.

The apparatus of the present invention comprises generally a relatively large number of strips arranged in a plurality of bins; a read-write station which includes a rotatable drum, a read-write transducer, and a strip pickup device carried with the drum and operable to pick a selected strip, wrap it on the drum and return it to its original position; suitable means for relatively positioning the strip pickup device adjacent a selected strip; and means for rotating the drum member in two directions in response to control signals to cause operation of the strip pickup device.

It is therefore an object of the present invention to provide an improved data storage apparatus.

Another object of the present invention is to provide a compact data storage apparatus employing a plurality of cyclic-type carriers.

A further object of the present invention is to provide in an apparatus employing a large number of individual strips for data storage, means for selectively presenting each strip to the read-write transducer in a cyclic manner.

A still further object of the present invention is to provide a data storage apparatus in which a strip record disposed in a bin and having data recorded thereon may be completely retracted from the bin, wrapped on a drum for cyclic presentation to a transducer, and subsequently returned to the bin.

Other objects of the invention will be pointed out in the following description and claims and illustrated in the accompanying drawings which disclose, by way of example, the principle of the invention and the best mode which has been contemplated of applying that principle.

Figures 3, 3A:
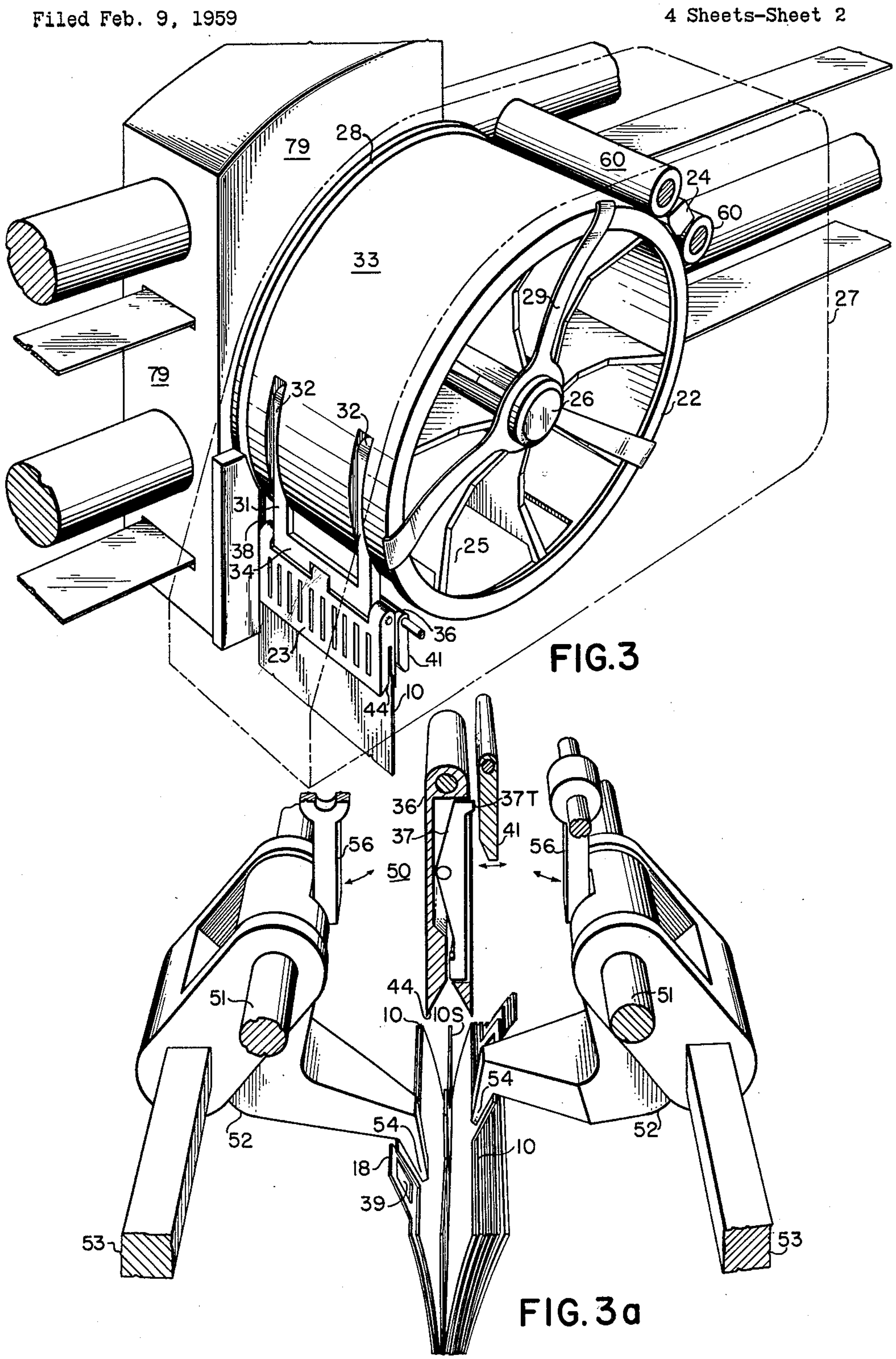
FIG. 3 is a perspective view of the movable read-write station.

FIG. 3*a* is a perspective view of the strip selector unit.

Figure 4:
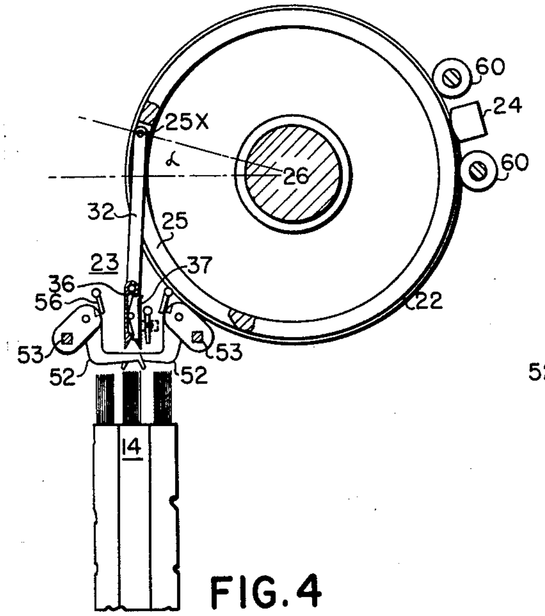
Figure 4A:
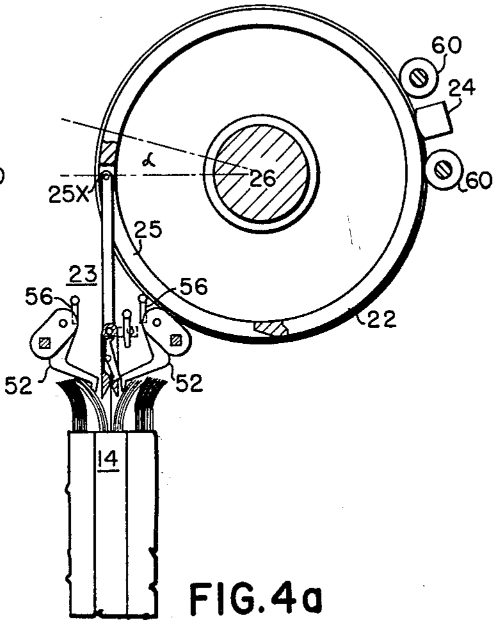
Figure 4B:
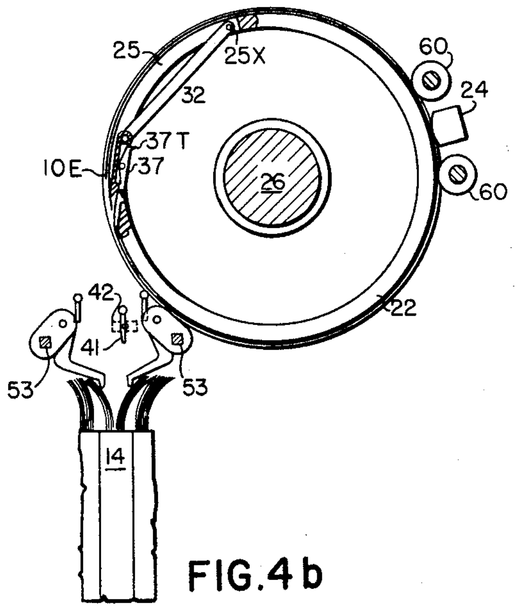
Figure 4C:
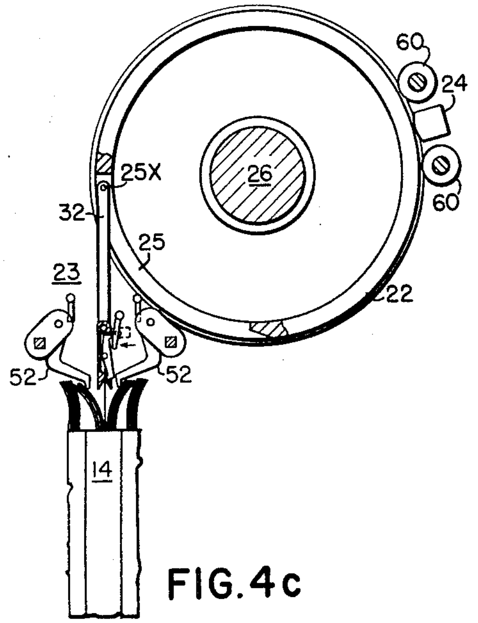

FIGS. 4 through 4*c* are views illustrating schematically the removal of the strip from the bin, the wrapping of the strip on the drum for cyclic presentation to the read-write transducer, and the replacement of the strip in the cell.

Figures 5, 6:
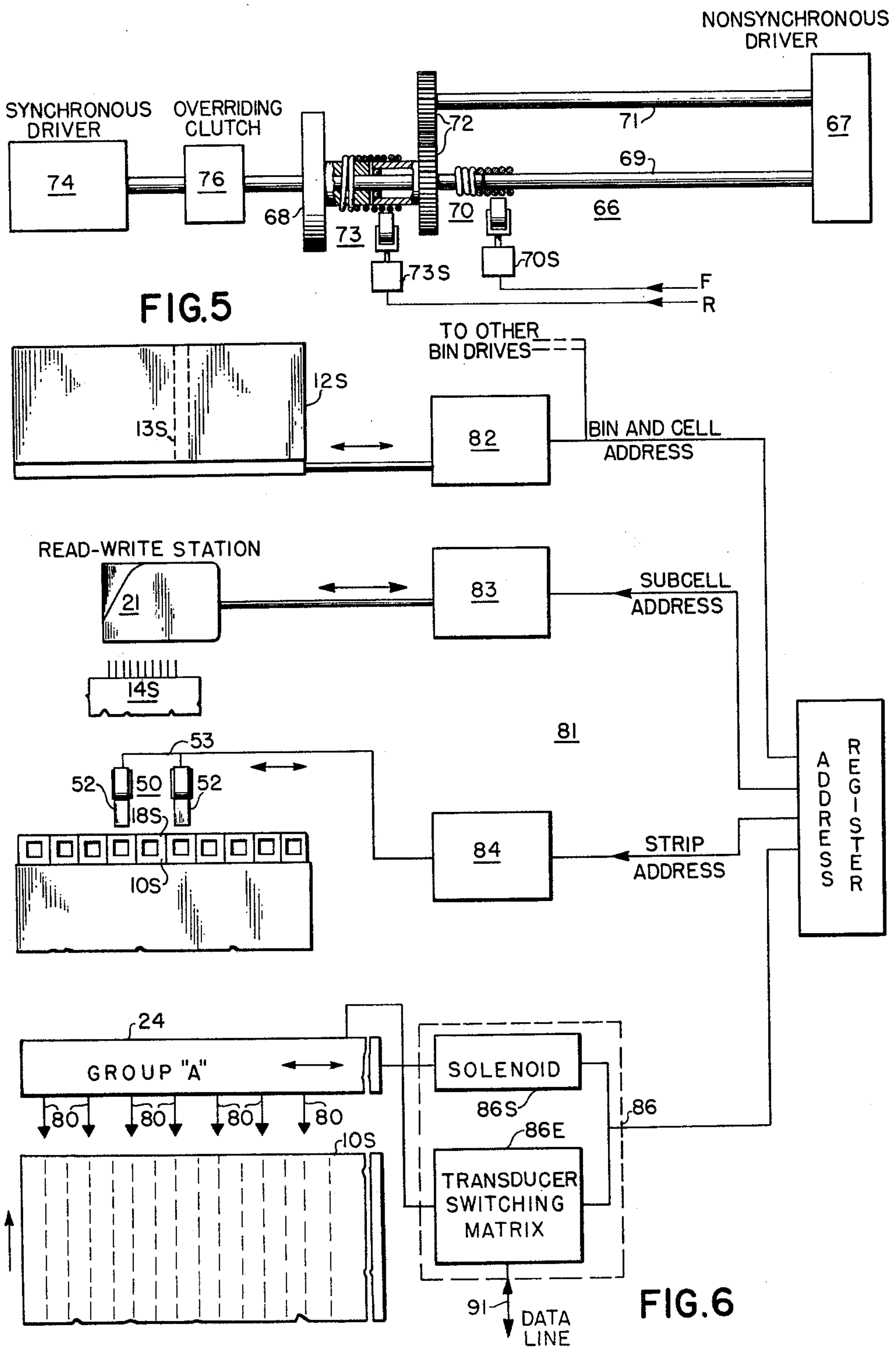

FIG. 5 is a block diagram of the means for driving the drum to perform the operation shown in FIGS. 4 through 4*c*.

FIG. 6 is a schematic view of the access system for presenting a selected character channel to the read-write transducer.

Figures 1, 2:
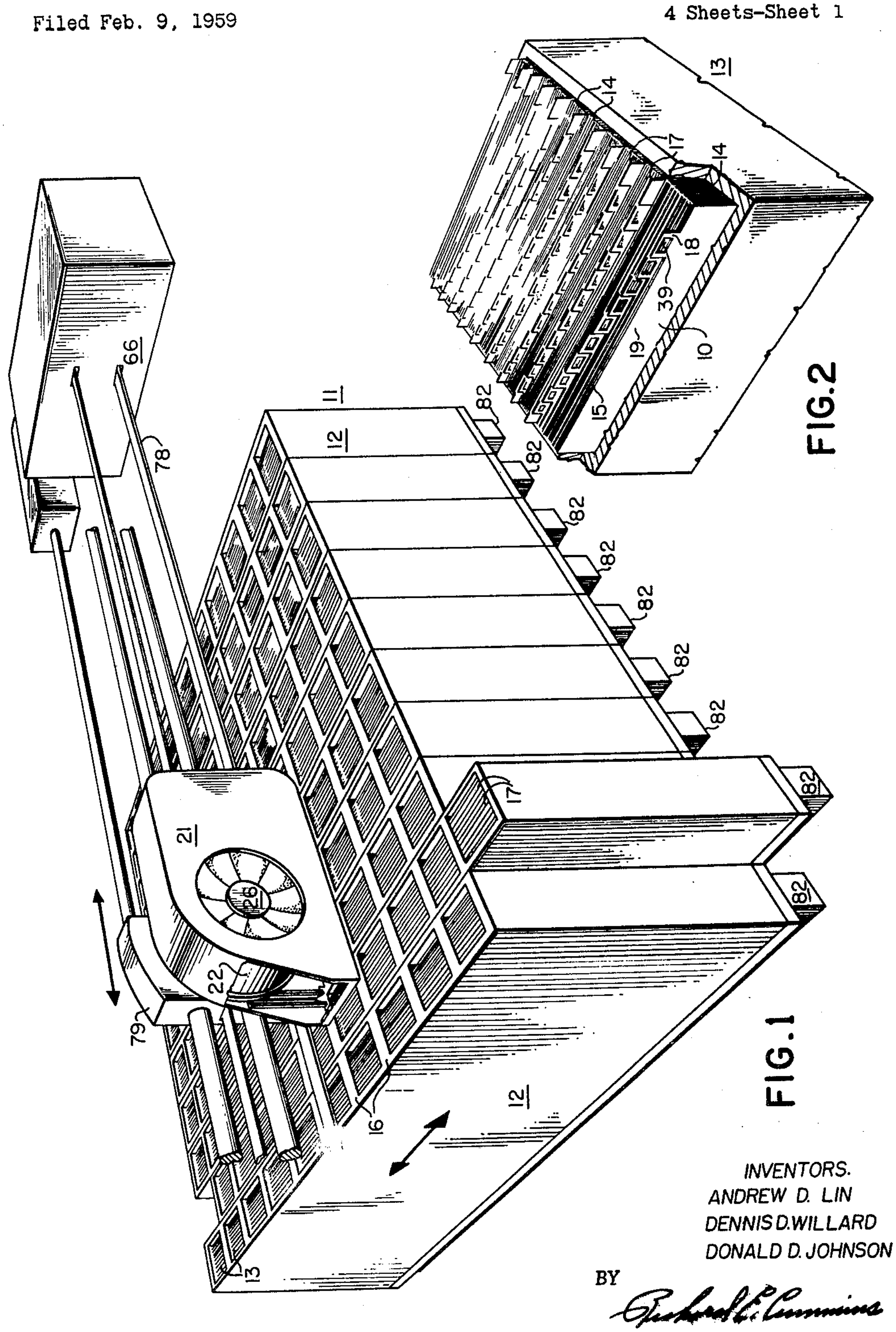
FIG. 1 is a perspective view of a data storage apparatus embodying the present invention.
FIG. 2 is a perspective view illustrating one of the cells of storing the strip records.

Referring to the drawings and particularly to FIGS. 1 and 2, the data storage apparatus shown therein comprises generally a relatively large plurality of separate record strips 10 which are stored in a bin array assembly 11. The bin array assembly 11 comprises ten bins 12, each bin being divided into ten cells 13 and each cell being divided into ten subcells 14. The bins 12 are slidably mounted relative to each other along parallel axes so that any cell 13 of a bin may be positioned relative to a reference axis which is at a right angle to the motion of the bin. The partitions 16 between cells are therefore parallel to the reference axis while the partitions 17 between subcells are parallel to the motion of the bin. Each subcell 14 comprises ten individual record strips 10 which are disposed with their planar surfaces parallel to the motion of the bins. The strips 10 are similar except for the position of an ear portion 18. In each subcell 14 the ear portions 18 of the strips 10 are located differently, preferably in an offset relationship relative to each other to facilitate the selection of a desired strip by the particular strip selection device illustrated and explained later on in the specification.

The upper portion of one record strip may be seen in FIG. 2. The strip 10 in practice is approximately 1⅝" wide, 11" long and .005" thick with a magnetizable surface 19 on one side. The base material of the strip may be a flexible material such as Mylar type plastic. However, the particular details of the record form no part of the present invention and any suitable compliant record strip known in the art may be employed.

The strip 10 is capable of storing 70 parallel recording tracks with each track capable of recording 10,000 binary bits of information. In the apparatus disclosed, characters are recorded parallelly by bit and serially by character along parallel tracks extending normal to the free edge 15 of the strip. Assuming a character is definable by seven binary bits, ten character channels are provided on each record strip 10 with each channel having the capacity of storing ten thousand separate data characters in addition to control characters. Each strip 10 therefore stores one hundred thousand characters plus control information, each subcell 14 stores one million characters, each cell 13 stores ten million characters, each bin stores one hundred million characters, and hence the complete bin assembly 11, as illustrated, has a capacity of one billion separate 7-bit characters. The physical space occupied by the bin array 11 is approximately two feet square by eighteen inches deep.

The apparatus further includes a movable read-write station 21 which is shown in detail in FIG. 3. With reference to FIG. 3, the read-write station 21 is mounted for movement along the reference axis at right angles to the movement of the bins 12 and comprises generally a rotatable drum member 22, a device 23 carried by the drum for picking a selected strip 10 from a subcell, wrapping it on the drum 22 and returning it to the subcell, and a read-write transducer unit 24 mounted in data transferring relationship to the strip 10 when it is wrapped on the drum 22. The drum member 22 is mounted on a shaft 26 which is disposed in suitable bearings (not shown) in the housing 27 for the read-write station. The drum 22 rotates on an axis which is parallel to the motion of the bins and is provided with a circumferential flange 28 which acts as an accurate edge for referencing the record strip 10 axially of the drum. Suitable biasing means may be provided for urging the strip 10 to this reference edge. As shown, this biasing means comprises a spider-type leaf spring 29 which engages the long edge of the strip as it is being wrapped on the drum 22.

The means for retracting a selected strip 10 from a subcell 14 and wrapping it on the drum comprises the strip picking device 23 which is carried by the drum 22. The drum may be provided with a portion of its circumferential surface recessed or cut away to allow the picking device 23 to be positioned below the surface during rotation. The picking device, as shown in FIG. 3, has a U-shaped member 31 whose arms 32 are mounted in the drum 22 for swinging movement about an axis 25X which is disposed parallel to the drum shaft 26 and radially inward of the curved surface 33 of the drum. Attached to the base portion 34 of the U-shaped member 31 is a picker body 36 which carries a comb-like latch member 37 (seen in FIG. 3*a*) mounted for rocking motion relative to the pickup body 36. The pickup body 36 and comb latch member 37 extend parallel to the top edges of the strips 10 for a distance corresponding to the strip width and are guided in their movement along a picking path by suitable guides 38 disposed in the housing 27. The teeth of the comb-like latch member 37 are spaced in accordance with the spacing of the pickup holes 39 in the offset ear portions 18 of the ten strips which make up each subcell 14. The comb-like latch member 37 is spring biased to a position wherein each tooth cooperates with a portion of the pickup body 36 to form a jaw-like latch. A spring biased pivotally mounted strip release bar 41 actuated by a cam plate 42 is also provided for releasing the comb-like latch member 37 as explained later in the specification.

The strip picking device 23 when in a ready position, lies parallel to the plane of the ten strips of a subcell 14 and is disposed on a strip picking path defined by the guides 38. In this instance the strip picking path is substantially straight and tangent to the drum 22. The distal edge of the pickup body 36, which is adjacent the free edge of the strips, is provided with a V-shaped slot 44 for guiding the selected strip 10 into engagement with the latch member 37. The opening of the V-shaped slot 44 in the illustrated arrangement is determined by the thickness of a subcell 14 or, in other words, the thickness of ten strips. The reason for this will become obvious as the operation of the strip selection unit 50 is explained.

The strip selecting unit 50, as shown in FIG. 3*a*, includes a pair of stationary guide rods 51 which, in the present embodiment, are fixedly attached to the housing 27 of the read-write station 21 and hence move with the read-write station. The housing 27 has been omitted in FIG. 3*a* for clarity reasons. The axes of the guide rods 51 are parallel to the drum axis 26 and lie in a plane normal to the planes of the record strips. The guide rods 51 are spaced apart in this plane in a direction transverse to their axes for a distance which allows the strip picking device 23 to pass through. A separator arm 52 is slidably mounted on each guide rod 51 for movement along the axis of the rod. The distal ends 54 of the arms are offset relative to each other in the axial direction for a distance slightly greater than the width of one ear portion 18 of a strip and are ganged together for conjoint movement along the axes of their respective guide rods 51 by means of a connector 53 which is broken away in FIG. 3*a*. Connector 53 is attached to the strip selection positioning means as shown in FIG. 6. The separator arms 52 are also mounted for pivotal movement in opposite directions about their respective guide rods 51 and are biased to the position shown in FIG. 4 wherein their distal ends 54 overlap and lie on opposite sides of the plane containing the strip picking device 23.

The strip selection mechanism further includes a means for conjointly moving the separator arms axially to position the offset arms 52 on opposite sides of the ear portion 18 of the selected strip 10 so that upon rotation of the separator arms 52 in the downward direction the upper portions of the strips 10 on both sides of the selected strip are bent away from the selected strip thereby presenting only one strip 10 to the strip picking device 23. The strip picking positioning means is discussed further in the specification in relation to the overall access system shown in FIG. 6.

The downward pivotal movement of the separator arms 52 may be obtained in response to the downward thrust of the picker body 36 as the drum 22 is rotated counterclockwise, as shown in FIG. 4*a*, or a separate driving means may be provided.

In order to facilitate replacement of the strip 10 in the subcell, each arm 52 is provided with a latch element 56. The arms 52 are therefore latched in the open position as shown in FIG. 3*a* until the selected strip is returned to the bin. The latch elements 56 may be released by a latch cam plate (not shown) which is under the control of the drum position and a return signal. The strip selection means 50 described above serves as the preferred means for presenting a single strip 10 to the strip picking device 23, although other devices may be employed if desired.

In order for the selected strip 10 to be picked, wrapped on the drum member 22 and returned to the subcell 14, it is necessary to rotate the drum in both directions in a predetermined sequence. As mentioned previously, the home or ready position of the drum 22 and picking device 23 is illustrated in FIG. 4 wherein the strip picking device 23 is guided in the plane of the subcell 14 containing the selected record strip along a path which is substantially in a tangential relationship with the surface of the drum.

In picking the selected strip, the drum 22 is first rotated counterclockwise through a predetermined angle $\alpha$ to cause the picking unit 23 to latch onto the selected strip 10, as shown in FIG. 4*a*. The rotation of the drum 22 is then reversed to a clockwise rotation which causes the strip to be retracted from the subcell and wrapped on the drum which has a circumference slightly less than the length of the strip so that the end portion 10E of the strip overlaps the free edge 15 which is held by the picker body 36, as shown in FIG. 4*b*. Suitable strip guides in the form of rollers 60 may be provided adjacent the drum 22 to insure compliance of the strip 10 to the drum surface. A pair of these guide rollers 60 are shown on opposite sides of the transducer unit 24. The drum may be rotated clockwise for any desired number of complete revolutions so that the tracks on the record strip 10 are presented to the transducer unit 24 in a cyclic fashion. Upon completion of the data transferring operation by the transducer unit the rotation of the drum is again reversed at a predetermined angular location which corresponds to the end portion 10E of the strip being positioned adjacent the guide surface formed by the housing. This position may also be represented in FIG. 4*b*. Rotation of the drum 22 counterclockwise from the position shown in FIG. 4*b* returns the strip 10 to its original position in the subcell. Immediately prior to the strip hitting bottom the strip release bar 41 is pivoted to the position shown in FIG. 4*b* and engages the toe portion 37T of the comb-like latch member 37, causing it to be rocked to a release position as shown in FIG. 4*c*. The rotation of the drum 22 is again reversed so that the drum rotates clockwise through the angle $\alpha$ to the ready position shown in FIG. 4 where it is stopped.

The means 66 for rotating the drum 22 to provide the desired operation illustrated in FIGS. 4 through 4*c* is shown diagrammatically in FIG. 5. The driving means 66, illustrated in block form in FIG. 5 which corresponds to the block designated by the similar reference number in FIG. 1, is disclosed in detail in copending application Serial No. 791,643, filed February 6, 1959, now patent 2,923,172, which is assigned to the same assignee as the present invention. Hence, the description of the diagrammatically illustrated driving means 66 shown in FIG. 5 is limited to the extent necessary to provide an understanding of its operation and function in the disclosed environment. Further details of driving means 66 may be had by reference to the above mentioned copending application.

With reference to FIG. 5, the driving means comprises a nonsynchronous motor 67 which is designed to drive the driven member 68 in a forward direction through a torsion shaft 69 and an electromagnetically operated spring-type clutch 70, and in the reverse direction through a torsion bar 71 and a reversing gear drive 72 which is also clutched to the driven member 68 by an electromagnetically operated spring-type clutch 73. A synchronous driver 74 is also connected to the driven member 68 through an overriding clutch 76. The synchronous driver 74 and the overriding clutch 76 function to maintain the speed of the driven member 68 constant in the forward direction and are disconnected from the driven member 68 when it is moved in the reverse direction. The speed and direction of the driven member 68 may therefore be controlled by supplying suitable control signals selectively to the solenoids 70S and 73S of the electromagnetic spring clutches.

As shown in FIG. 1, the driving means 66 is spaced from the drum 22 of the read-write station 21 and a tape 78 is employed to transmit the motion of the driven member 68 to the drum shaft 26, the tape being selectively clutched to the drum shaft by a suitable clutching device located in the box designated by reference character 79 in FIGS. 1 and 3*a*. However, it should be noted that the driving means 66 may be connected directly to the drum 22 and moved with the readwrite station. Similarly, other types of driving means capable of performing the same function may be employed if desired.

The transfer of data to and from the record strip when it is wrapped on the drum is accomplished by the read-write transducer unit 24 in accordance with conventional recording techniques well known in the art. Any suitable magnetic transducer means may be employed and, while only one transducer unit 24 is shown, it will be obvious that a number of such transducer units may be employed at circumferentially spaced locations around the drum 22 as desired. Similarly, while the transducer unit shown is a combination read-write type of transducer, individual write transducers and individual read transducers may be provided. The transducer unit may be of the type where the transducer element is in actual contact with the strip or of the air bearing type wherein the transducer element is spaced from the actual recording surface by a thin film of air.

The transducer unit 24 is shown schematically in FIG. 6 and includes 35 separate transducer elements 80 arranged in five groups with seven elements per group. The elements 80 are ganged for conjoint movement by a positing device 86S discussed later in connection with the access system shown in FIG. 6. The 35 separate elements are connected to a transducer switching matrix 86E wherein any one of the five groups of seven elements may be made selectively operable to transfer data to and from a selected character channel on the selected strip.

The access system for the apparatus, as shown in FIG. 6, functions to provide access to any selected character channel in the bin array assembly 11 for the transfer of data to and from that channel. The access system 81, as illustrated diagrammatically in FIG. 6, comprises means 82 for moving a selected bin 12S to position a selected cell 13S centrally of the reference axis corresponding to the movement of the read-write station 21, means 83 for moving the read-write station 21 along this reference axis to, together with the strip selection device 50 and the strip picking device 23 over the selected subcell 14S, means 84 attached to connector 53 for moving the strip selection device 50 parallel to the ten strips 10 of the selected subcell 14S to position the separator arms 52 on either side of the ear portion 18S of the selected strip 10S, means 86 for selecting a particular character channel on the strip 10S which comprises mechanical means 86S for moving the transducer unit 24 transversely of the character channels to one of two positions and electronic means 86E for selectively operating one of five groups of transducer elements 80 corresponding to the selected character channel.

The positioning means 82–84 for the bins 12, the read-write station 21 and the strip selection device 50 and the transducer unit 24 are all shown diagrammatically by blocks in that the details of these devices per se form no part of the present invention. Any suitable mechanical, electrical or hydraulic positioning device known in the art may be employed. For example, for hydraulic positioning device disclosed in copending application Serial No. 782,387, filed December 29, 1958, and now Patent No. 3,090,201, and assigned to the same assignee as the present invention may be employed for discretly positioning the bins 12, the read-write station 21 and the strip selection unit 50 in response to address signals, while the transducer unit positioning device 86S may in the simplest form comprise an electromagnetic solenoid-type positioning device.

Similarly, the electronic elements selecting device 86E may comprise any suitable type of electronic switching arrangement capable of performing the function of selecting one of five groups of elements 80. Since such circuits are known in the art, the group selection matrix 86E is shown also in block form.

Each character channel A–J contained in the bin array has a unique address and the various components of the access system operate in response to different portions of the address. For example, the address of a character channel is defined by the bin, the cell, the subcell, the strip in the subcell, the position of the transducer unit, and the switch connection of the matrix. It should be noted that each of the components of the access system operates in a parallel fashion or on a time sharing basis so that the access times of the components are not accumulative.

The operation of the data storage apparatus is as follows. Assuming an address signal is supplied to the access system from an address register 90, the bin and cell address portion thereof actuates the corresponding bin positioning means 82 and causes the bin 12 to be moved as shown in FIG. 1 so that the corresponding cell is positioned relative to the reference axis of the read-write station 21. Simultaneously, the subcell address is supplied to the positioning means 83 of the read-write station 21 which actuates means 83 to position the read-write station 21 and the strip selection device 50 relative to the corresponding subcell 14S. Also simultaneously the strip address is supplied to the strip selection positioning means 84 attached to bar connector 53 which positions the offset selector arms 52 on either side of the ear portion 18S of the selected strip 10S. The character channel address may also be supplied to the character channel selection means 86 at this time to actuate the solenoid 86S to position the transducer unit 24 relative to the corresponding set of character channels. The group address applied to the selection matrix therefore connects the corresponding groups of transducer elements 80 to the data line 91 so that the character channel corresponding to the complete address supplied to the access system is now in a position to receive data from or supply data to the data line. The condition of the apparatus at this instant is best shown in FIG. 4. Assuming that the driving means 66 has been suitably energized and that a control signal is supplied to the reverse drive solenoid 73S so that the tape 78 is moving counterclockwise as shown in FIG. 1, a strip pickup signal is supplied to the drum clutch, causing the drum 22 to rotate counterclockwise from the position shown in FIG. 4 to the position shown in FIG. 4*a*. The downward thrust of the strip picking device 23 forces the separator arms 52 apart, causing the strips 10 on either side of the selected strip 10S to be moved out of alignment with the V-shaped notch 44 of the strip picker body 36. On engagement of the comb-like latch member 37 in the hole 39 of the selected strip 10S, the rotation of the drum 22 is reversed at this instant by supplying a suitable control signal to the solenoid 70S of the forward drive clutch of the driving means 66.

The rotation of the drum 22 is now clockwise, which causes the strip 10S to be retracted from the subcell 14S and wrapped on the drum 22 as shown in FIG. 4*b*. The data transfer operation may begin on the first or subsequent pass of the strip past the transducer unit 24, depending upon the time required for the drum 22 to obtain operating speed. In the embodiment shown, the driving means 66 illustrated is sufficient to bring the drum up to recording speed if the transducer unit 24 is slightly more than 180° from the initial starting point of the strip. In other words, the operational speed of drum 22, which is substantially 1200 r.p.m., may be obtained somewhere between one-half and three-quarters of the first drum revolution. The actual data transfer operation to and from the strip may be controlled by conventional read-write circuitry (not shown) and depends primarily upon the particular data processing operation being performed. It will be sufficient for an understanding of the present invention to assume that data signals supplied to the data line 91 during a write operation will be recorded by the transducer unit 24 on the character channel selected and that during a read operation the data recorded on the selected character channel is supplied to the data line 91 by the transducer unit 24.

Upon completion of a data transfer operation as determined by programmed criteria external to the storage apparatus, a reverse signal is supplied to the solenoid 73S of the reverse drive spring clutch 73 to cause counterclockwise rotation of the drum. At the beginning of this counterclockwise rotation the angular position of the drum 22 is represented by FIG. 4*b* wherein the end of the strip 10E is adjacent the strip guide 38 formed in the housing. Counterclockwise rotation of the drum replaces the strip in the subcell as shown in FIG. 4*c*. At some time subsequent to the strip removal and prior to the replacement of the strip, the latch release bar 41 is actuated to the position shown in FIG. 4*b* by the solenoid operated cam plate 42 so that the comb-like latch member 37 engages the strip release bar 41 and releases the strip as shown in FIG. 4*c*. The rotation of the drum 22 is again reversed by application of a control signal to the solenoid 70S of the forward drive clutch 70 which retracts the empty strip picking device 23 and returns the drum 22 to the position shown in FIG. 4. The separator arm latches 56 are released by movement of a cam plate (not shown) allowing the separator arms 52 of the strip selection device 50 to return also to the position shown in FIG. 4. A clutch release signal is supplied to the drum clutch so that the apparatus may be addressed to the next desired strip. The maximum time required for the foregoing operation, assuming only one complete cyclic presentation of the strip 10S to the transducer unit 24, is in the neighborhood of 450 milliseconds.

Various modifications of the basic apparatus are possible. For example, by providing two similar read-write stations, the access time to a selected character channel could be reduced effectively, in that while one station is transferring data, the other station could be moving to another address location. Additionally, the data storage capacity of the apparatus may be increased from one billion characters to two billion characters by providing a recording surface 19 on both sides of the strip and turning the second read-write station 180° to the one illustrated in FIG. 1, so that in picking a strip the opposite side of the strip is presented to its transducer unit.

While there have been shown and described and pointed out the fundamental novel features of the invention as applied to the preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A random access data storage apparatus comprising in combination a plurality of separate short compliant noncyclic type record carriers for storing data, means for storing said carriers in an array, a transducer unit mounted in a fixed position and operable to transfer data signal representations to and from a selected record carrier, means for transporting a selected one of said carriers from the array to said transducer unit, and means for translating the carrier relative to said transducer unit in a cyclic manner to present the full length of the carrier to the transducer unit during a single cycle of movement of the carrier.

2. A random access data storage apparatus comprising in combination a plurality short flexible separate strips for storing data, means for storing said strips in an array, a transducer unit mounted in a fixed position and operable to transfer data signal representations to and from a selected strip, means for removing a selected strip completely from the array and transporting said strip from the array to said transducer unit, and means for translating the strip relative to said transducer unit in a cyclic manner to present the full length of the strip to the transducer unit during a single cycle of movement of the strip.

3. A random access data storage apparatus comprising in combination a plurality of short compliant strips for storing data representations, means for storing said strips in an array, a transducer unit mounted in a fixed position and operable to transfer data representations to and from a selected strip, and means including a mechanism having a device for removing a selected strip completely from the array and a member for rotating said device and said strip in a cyclic manner relative to said unit whereby data representations may be transferred to and from said selected strip over the full length thereof during a single rotation of the member.

4. A data storage apparatus comprising in combination a plurality of short separate compliant record carriers, means for storing said carriers in an array with a portion of each said carrier accessible to a carrier picking device, a transducer unit, and means for presenting a selected carrier to said transducer unit in a cyclic manner comprising a carrier picking device, means for rendering a selected one of said carriers accessible to said carrier picking device, a member mounted for rotation relative to said transducer unit, means pivotally mounting one end of said carrier picking device in a recess portion of said member to cause the position of said picking device to be controlled by the angular position of said member measured from a predetermined home position, means operable during rotation of said member from said home position through a predetermined angle for guiding the distal end of said carrier picking device along a carrier picking path extending from a selected carrier to a point tangently disposed on the circle described by the pivotal axis of said device as its rotates about the axis of said member, and driving means connected to said member for rotating said member to cause the selected carrier to be picked and wrapped on said member for cyclic presentation to said transducer unit.

5. A data storage apparatus comprising in combination a plurality of separate compliant record strips for storing data, means mounting said strips in a closely packed array with corresponding free edges of said strips parallel, a read-write station comprising a transducer unit and means for translating a selected one of said record strips to said transducer unit in a cyclic manner, said translating means comprising a drum member having a circumferential surface corresponding in length to the length of one of said record strips, means mounting said drum for rotation about an axis parallel to said free edges and spaced from said transducer unit to position said surface adjacent said transducer unit, strip picking means, means mounting said picking means in a recess portion of said drum surface for pivotal movement from a first strip picking position substantially tangent to the curved surface of said drum to a second position recessed below the surface of said drum, means for guiding said picking means into picking engagement with the free edge of said selected strip upon rotation of said drum whereby further rotation of said drum retracts the selected strip from said strip mounting means and wraps it on the drum for cyclic presentation to said transducer unit.

6. A data storage apparatus comprising in combination a plurality of separate compliant record strips for storing data, means for maintaining said strips in a closely packed array with corresponding free edges of said strips in different strip picking planes, a read-write station including a transducer unit and means for translating a selected one of said record strips relative to said transducer unit in a cyclic manner, said translating means comprising a strip receiving member mounted for rotation about an axis parallel to said free edges and spaced from said transducer unit to position the surface of a received strip in data transferring relationship with said transducer unit, strip picking means, means mounting said picking means in a recess portion of said strip receiving member for pivotal movement from a first strip picking position parallel to said strip picking planes to a second position in said recessed portion, means disposed adjacent said member for guiding said strip picking means into picking engagement with the free edge of a selected strip upon rotation of said strip receiving member in one direction through a predetermined angle whereby rotation of said strip receiving member in the opposite direction causes the selected strip to be received and translated relative to the transducer unit in a cyclic fashion.

7. A data storage apparatus comprising in combination a plurality of separate compliant record strips each having a magnetizable surface for storing data, means for maintaining said strips in a closely packed array with corresponding free edges of said strips in different strip picking planes, a read-write station including a magnetic transducer unit and means for translating a selected one of said record strips relative to said transducer unit in a cyclic manner, said translating means comprising a strip receiving member mounted for rotation about an axis parallel to said free edges and spaced from said transducer unit to position the surface of a received strip in flux transferring relationship with said magnetic transducer unit, strip picking means operable to engage the free edge of a selected strip, means mounting said picking means in a recessed portion of said strip receiving member for pivotal movement from a first strip picking position parallel to said strip picking planes to a second position in said recessed portion, means for guiding the distal end of said pivotally mounted strip picking means into picking engagement with the free edge of a selected strip upon rotation of said strip receiving member in one direction through a predetermined angle whereby rotation of said strip receiving member in the opposite direction causes the selected strip to be received and translated relative to the transducer unit in a cyclic fashion.

8. A data storage apparatus comprising in combination a plurality of separate compliant strips each having a magnetizable surface for storing data, means for maintaining said strips in a closely packed array with corresponding free edges of said strips in different strip picking planes, a read-write station including a housing having an inner cylindrical surface the axis of which is parallel to said free edges, a magnetic transducer unit mounted in said housing, and means for translating a selected one of said strips relative to said transducer unit in a cyclic manner, said translating means comprising a strip receiving member mounted coaxially with said axis for rotational movement relative to said cylindrical surface to cause the recording surface of a received strip to be positioned in recording relationship to said transducer unit, said strip picking means including a pickup body, means mounting one end of said picking means in a recessed portion of said strip receiving member for pivotal movement from a first strip picking position parallel to said strip picking planes to a second position in said recessed portion, a guide track formed in said housing for guiding the distal end of said strip picking means along a strip picking path extending from the free edge of a selected strip to a point on said selected cylindrical surface in accordance with rotation of said strip receiving member through a predetermined angle whereby rotation of said strip receiving member causes the selected strip to be received and presented to the transducer unit in a cyclic fashion.

9. A data storage apparatus comprising in combination a plurality of compliant magnetizable record strips each having a plurality of parallel recording tracks, means mounting said record strips in a closely packed array with corresponding free edges of said strips transverse to said tracks and in different parallel strip picking planes, a magnetic transducer unit operable to transfer data representations to and from a selected track of a selected record strip, means for presenting a selected one of said record strips to said transducer unit in a cyclic fashion comprising a strip receiving member mounted for rotation about an axis parallel to said strip receiving planes and spaced from said transducer unit to position a received strip in data transferring relationship with said transducer unit, a strip picking means, means mounting said strip picking means in a recessed portion of said member for pivotal movement about an axis parallel to said rotational axis, a guide means positioned adjacent said member for guiding the distal end of said picking means during its pivotal movement along a strip path extending from the free edge of the selected strip to a point adjacent the circle subscribed by the rotational surface of said member, means for moving nonselected strips adjacent said selected strip out of their respective planes, means connected to said member for rotating said member in one direction from a predetermined position to move said picking means along said path into engagement with the selected strip, means for reversing said rotating means to cause said strip to be completely retracted from said strip mounting means and wrapped on said member for cyclic presentation to said transducer unit, and means for again reversing said rotation after a predetermined number of cyclic presentations to return said selected strip to its original strip picking plane.

10. In a data storage apparatus having a plurality of separate compliant record carriers mounted in a closely packed array with corresponding free edges of said carriers engageable by a carrier picking device and a transducer unit operable to transfer data to and from selected carriers, the combination comprising a carrier device mounted for rotation relative to said transducer unit to translate a received carrier cyclically past said unit in data transferring relationship thereto, a carrier picking means, means mounting said carrier picking means in a recessed portion of said member for pivotal movement about an axis parallel to said rotational axis, guide means positioned adjacent said member for guiding the distal end of said pivotally mounted picking means along a carrier picking path extending from the free edges of said carriers to a point adjacent a reference circle subscribed by the rotational surface of said member, means for presenting only a selected carrier to said carrier picking means, means connected to said member for rotating said member in one direction from a predetermined position to move said picking means along said path into picking engagement with the carrier presented by said presenting means, means for reversing said rotating means to cause said carrier to be completely retracted from said carrier mounting means and wrapped on said member for cyclic presentation to said transducer unit, and means for again reversing said rotation after a predetermined number of cyclic presentations to return said selected strip to its original strip picking plane.

11. In a data storage apparatus having a plurality of separate compliant record carriers mounted in array with corresponding exposed portions positioned in engageable relationship with a carrier picking device and a transducer unit operable to transfer data to and from a selected carrier, the combination comprising a carrier picking means, a rotatable shaft, means connecting said shaft in motion transmitting relationship with said picking means, means pivotally mounting one end of said picking means to said connecting means to provide for pivotal movement of the distal end of said picking means about an axis parallel to said shaft axis, means for guiding said distal end along a path including a continuous re-entrant portion disposed adjacent said transducer unit and a strip picking portion extending from an exposed portion of a selected carrier to a point on said continuous portion, means coupled to said shaft for rotating said shaft to cause movement of said picking means along said carrier picking portion of said path to engage a selected carrier and cause said carrier to be completely retracted from its mounting means for movement along said continuous portion of said path past said transducer unit for a predetermined number of cycles, means for reversing the direction of said rotating means to move said picking means along said carrier picking portion of said path in the reverse direction whereby said selected carrier is returned to its original position.

12. The invention recited in claim 11 in which an access system is provided for moving said shaft, said picking means and said guide means conjointly relative to said array to position said picking means in a carrier picking relationship with a selected carrier in response to an address signal.

13. A data storage apparatus having a plurality of separate compliant record strips, a bin array for mounting said strips with corresponding edges positioned in engageable relationship with a strip picking device, and a bin array including a plurality of bins each having a plurality of cells, each of said bins being movable relative to each other in parallel planes to position a selected cell relative to a reference axis disposed mutually perpendicular to said planes, a movable read-write station comprising a strip picking means, a rotatable shaft, means connecting said shaft in motion transmitting relationship with said picking means, means pivotally mounting one end of said picking means to said connecting means to provide for pivotal movement of the distal end of said picking means about an axis parallel to said shaft axis, means for guiding said distal end along a path including a continuous re-entrant portion and a strip picking portion extending from a free edge of a selected strip to a point on said continuous portion, and a transducer unit mounted adjacent said continuous portion to transfer data to and from a selected strip, an access system including first means for moving a selected bin to position a selected cell relative to said reference axis, means for moving said read-write station along said reference axis to position the strip picking portion of said path relative to a selected group of strips in said cell third means for selecting one of said strips in said selected group, and means for providing address signals to said access system, means coupled to said shaft for rotating said shaft to cause movement of said picking means along said strip picking portion of said path to engage said selected strip and cause said strip to be completely retracted from said group for movement along said continuous portion of said path past said transducer unit for a predetermined number of cycles, means for reversing the direction of said rotating means to move said picking means along said carrier picking portion of said path in the reverse direction whereby said selected carrier is returned to its original position in said group.

14. A random access data storage apparatus comprising: a plurality of elongated flexible strips for storing data; storage means maintaining the strips in a closely packed array; a read-write station for processing data signal representation on a strip, the read-write station including a rotatable drum and a transducer mounted in a fixed position and spaced slightly from the drum spaced slightly therefrom; means for transporting a selected strip to the read-write station; and means for attaching the strip to the drum for presenting the full length of the selected strip to the transducer in a cyclic manner to process data thereon.

15. A random access data storage apparatus comprising: a plurality of elongated flexible strips for storing data; storage means maintaining the strips in a closely packed array; a read-write station for processing data signal representations on a strip, the read-write station including a rotatable drum and a transducer mounted in a fixed position and spaced slightly from the drum spaced slightly therefrom; means for selecting a desired strip from the array; means for transporting the selected strip to the read-write station; and means for attaching the strip to the drum for presenting the full length of the selected strip to the transducer in a cyclic manner to process data thereon.

16. A random access data storage apparatus comprising: a plurality of elongated flexible strips for storing data; storage means maintaining the strips in a closely packed array; means for selecting a desired strip from the array; a read-write station for processing data signal representation on a selected strip, the read-write station including a rotatable drum and a transducer mounted in a fixed position and spaced slightly from the drum spaced slightly therefrom; means for completely withdrawing the selected strip from the array and transporting it to the read-write station; and means for attaching the strip to the drum for presenting the full length of the strip to the transducer in a cyclic manner to process data thereon.

(References on following page)

References Cited by the Examiner

UNITED STATES PATENTS

| | | | |
|---|---|---|---|
| 2,674,728 | 4/54 | Potter | 340—174.1 |
| 2,722,676 | 11/55 | Begun | 340—174.1 X |
| 2,766,985 | 10/56 | Claybourn et al. | 271—51 |
| 2,774,637 | 6/57 | Rugg | 271—51 |

| | | | |
|---|---|---|---|
| 2,842,754 | 7/58 | Luhn | 340—174 |
| 2,852,761 | 9/58 | Hagopian | 340—174 |
| 2,952,010 | 9/60 | Demer | 340—174.1 |

IRVING L. SRAGOW, *Primary Examiner.*

BERNARD KONICK, EVERETT R. REYNOLDS, *Examiners.*

UNITED STATES PATENT OFFICE

CERTIFICATE OF CORRECTION

Patent No. 3,176,279 March 30, 1965

Andrew D. Lin et al.

It is hereby certified that error appears in the above numbered patent requiring correction and that the said Letters Patent should read as corrected below.

Column 8, line 53, after "plurality" insert -- of --; column 12, lines 42 and 43, 54 and 55 and lines 68 and 69, strike out "spaced slightly therefrom", each occurrence.

Signed and sealed this 24th day of August 1965.

(SEAL)
Attest:

ERNEST W. SWIDER
Attesting Officer

EDWARD J. BRENNER
Commissioner of Patents

Notice of Adverse Decision in Interference

In Interference No. 96,488 involving Patent No. 3,176,279, A. D. Lin, D. D. Willard and D. D. Johnson, DATA STORAGE APPARATUS, final judgment adverse to the patentees was rendered June 12, 1970, as to claims 1, 2, 3, 14, 15 and 16.

[*Official Gazette September 8, 1970.*]